United States Patent
Duan et al.

(10) Patent No.: US 11,641,493 B2
(45) Date of Patent: May 2, 2023

(54) METHOD AND ELECTRONIC DEVICE FOR DISPLAYING BULLET SCREENS

(71) Applicant: BEIJING DAJIA INTERNET INFORMATION TECHNOLOGY CO., LTD., Beijing (CN)

(72) Inventors: Canchao Duan, Beijing (CN); Jiong Li, Beijing (CN); Qian Li, Beijing (CN); Dongsheng Tong, Beijing (CN); Huaqing Yang, Beijing (CN); Xiaoyu Yin, Beijing (CN); Yan Li, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 86 days.

(21) Appl. No.: 17/076,587

(22) Filed: Oct. 21, 2020

(65) Prior Publication Data
US 2021/0120305 A1 Apr. 22, 2021

(30) Foreign Application Priority Data

Oct. 21, 2019 (CN) .......................... 201911002043.2

(51) Int. Cl.
*H04N 21/431* (2011.01)
*H04N 21/44* (2011.01)
(Continued)

(52) U.S. Cl.
CPC ......... *H04N 21/4312* (2013.01); *G06V 20/46* (2022.01); *G06V 40/10* (2022.01);
(Continued)

(58) Field of Classification Search
None
See application file for complete search history.

(56) References Cited

U.S. PATENT DOCUMENTS

2015/0317513 A1\* 11/2015 Hu .......................... G06V 10/42
382/118
2020/0029119 A1\* 1/2020 Wang .................. H04N 21/4318
(Continued)

FOREIGN PATENT DOCUMENTS

| CN | 108989873 A | 12/2018 |
|----|-------------|---------|
| CN | 109120984 A | 1/2019 |

(Continued)

OTHER PUBLICATIONS

First Office Action of Chinese application No. 201911002043.2—23 pages (dated Aug. 25, 2020).

*Primary Examiner* — James R Marandi
(74) *Attorney, Agent, or Firm* — Knobbe, Martens, Olson & Bear, LLP

(57) ABSTRACT

A method for displaying bullet screens can include: acquiring detection boxes by detecting human-body parts in a plurality of image frames in a target video; and determining a masked region of each of the image frames based on detection boxes in the each of the image frames and a ratio of the detection boxes in the each of the image frames in an image frame to which the detection boxes belong, wherein the client player does not display bullet screens in the masked region when playing the target video.

10 Claims, 5 Drawing Sheets

(51) Int. Cl.
*H04N 21/472* (2011.01)
*H04N 21/845* (2011.01)
*G06V 20/40* (2022.01)
*G06V 40/10* (2022.01)

(52) U.S. Cl.
CPC ....... *H04N 21/44* (2013.01); *H04N 21/47217* (2013.01); *H04N 21/845* (2013.01)

(56) References Cited

U.S. PATENT DOCUMENTS

2020/0364461 A1* 11/2020 Shi .................... G06V 20/46
2022/0014819 A1* 1/2022 Liu .................... H04N 21/4316

FOREIGN PATENT DOCUMENTS

| CN | 109302619 | A | 2/2019 | | |
|----|-----------|---|--------|---|---|
| CN | 109391853 | A | 2/2019 | | |
| CN | 109618213 | A | 4/2019 | | |
| CN | 109862414 | A | 6/2019 | | |
| EP | 3709665 | A4 * | 9/2020 | ............... | G06T 3/00 |

* cited by examiner

METHOD AND ELECTRONIC DEVICE FOR DISPLAYING BULLET SCREENS

INCORPORATION BY REFERENCE TO ANY PRIORITY APPLICATIONS

The present disclosure is based on and claim priority under 35 U.S.C. 119 to Chinese patent application No. 201911002043.2, filed on Oct. 21, 2019, in the China National Intellectual Property Administration, the disclosure of which is herein incorporated by reference in its entirety.

TECHNICAL FIELD

The present disclosure relates to the field of computer technologies, and in particular to a method and electronic device for displaying bullet screens.

BACKGROUND

With popularization of bullet screens as a comment presentation form, bullet screen presentation has become an important product function in live streaming and video playback scenes.

Currently, major bullet screen websites or some live streaming products lunched bullet screen block-prevention functions, e.g., a function of preventing block of a human body. However, bullet screens may block the video content to some extent during their display period, and improvement of experience of bullet screen presentation becomes increasingly important.

SUMMARY

Embodiments of the present disclosure provide a method and electronic device for displaying bullet screens.

According to one aspect of embodiments of the present disclosure, a method for displaying bullet screens is provided. The method includes:
acquiring detection boxes by detecting human-body parts in a plurality of images in a target video;
determining a masked region of each of the image frames based on the detection boxes in the each of the image frames and a ratio of the detection boxes of the image frames in corresponding image frames;
receiving a video playback request; and
transmitting the target video, the masked region, and bullet screens to a client player based on the video playback request, wherein the client player hides the bullet screens in the masked region when playing the target video.

According to another aspect of embodiments of the present disclosure, a method for displaying bullet screens is provided. The method includes:
transmitting a video playback request to a server;
receiving a target video, a masked region of the target video, and bullet screens from the server in response to the video playback request; and
hiding the bullet screens in the masked region and displaying the bullet screens in a non-masked region in response to playing the target video.

According to yet another aspect of embodiments of the present disclosure, an electronic device is provided. The electronic device includes:
a processor; and
a memory storing at least one instruction executable by the processor,
wherein the at least one instruction, when executed by the processor, causes the processor to perform a method including:
acquiring detection boxes by detecting human-body parts in a plurality of image frames in a target video;
determining a masked region of each of the image frames based on the detection boxes in each of the image frames and a ratio of the detection boxes of the image frames in corresponding image frames;
receiving a video playback request; and
transmitting the target video, the masked region, and bullet screens to a client player based on the video playback request, wherein the client player hides bullet screens in the masked region when playing the target video.

According to yet another aspect of embodiments of the present disclosure, an electronic device is provided. The electronic device includes:
a processor; and
a memory storing at least one instruction executable by the processor,
wherein the at least one instruction, when executed by the processor, causes the processor to perform a method including:
transmitting a video playback request to a server;
receiving a target video, a masked region of the target video, and bullet screens from the server in response to the video playback request; and
hiding the bullet screens in the masked region and displaying the bullet screens in a non-masked region in response to playing the target video.

According to yet another aspect of embodiments of the present disclosure, a storage medium storing at least one instruction therein is provided. The at least one instruction, when executed by a processor of an electronic device, causes the electronic device to perform a method including:
acquiring detection boxes by detecting human-body parts in a plurality of image frames in a target video;
determining a masked region of each of the image frames based on the detection boxes in the each of the image frames and a ratio of the detection boxes of the image frames in corresponding image frames;
receiving a video playback request; and
transmitting the target video, the masked region, and bullet screens to a client player based on the video playback request, wherein the client player hides the bullet screens in the masked region when playing the target video.

According to yet another aspect of embodiments of the present disclosure, a storage medium storing at least one instruction therein is provided. The at least one instruction, when executed by a processor of an electronic device, causes the electronic device to perform a method including:
transmitting a video playback request to a server;
receiving a target video, a masked region of the target video and bullet screens from the server in response to the video playback request; and
hiding the bullet screens in the masked region and displaying the bullet screens in a non-masked region in response to playing the target video.

According to yet another aspect of embodiments of the present disclosure, a computer program product storing at least one instruction therein is provided. The at least one instruction, when executed by a processor of an electronic device, causes the electronic device to perform a method including:
acquiring detection boxes by detecting human-body parts in a plurality of image frames in a target video;

determining a masked region of each of the image frames based on the detection boxes in the each of the image frames and a ratio of the detection boxes of the image frames in corresponding image frames;

receiving a video playback request; and transmitting the target video, the masked region, and bullet screens to a client player based on the video playback request, wherein the client player hides the bullet screens in the masked region when playing the target video.

According to yet another aspect of embodiments of the present disclosure, a computer program product storing at least one instruction therein is provided. The at least one instruction, when executed by a processor of an electronic device, causes the electronic device to perform a method including:

transmitting a video playback request to a server;

receiving a target video, a masked region of the target video and bullet screens from the server in response to the video playback request; and hiding the bullet screens in the masked region and displaying the bullet screens in a non-masked region in response to playing the target video.

It should be understood that the above general descriptions and the followed detail descriptions are only illustrative, and are not intended to limit the present disclosure.

BRIEF DESCRIPTION OF THE DRAWINGS

The accompanying drawings herein, which are incorporated in and constitute part of the description, illustrate embodiments consistent with the present disclosure, serve to explain the principles of the present disclosure together with the description, and do not constitute an undue limitation to the present disclosure.

DETAILED DESCRIPTION

For better understanding of the technical solutions of the present disclosure by persons of ordinary skill in the art, the technical solutions in the embodiments of the present disclosure are described hereinafter clearly and completely with reference to the accompanying drawings.

It should be noted that the terms "first," "second," and the like in the description, claims and drawings of the present disclosure are used to distinguish similar objects, and need not be used to describe a specific order or sequence. It should be understood that data used in this way is interchangeable under appropriate circumstances such that the embodiments of the present disclosure described herein can be implemented in an order other than those illustrated or described herein. Implementations described in the following example embodiments do not represent all embodiments consistent with the present disclosure, but are merely examples of devices and methods consistent with some aspects of the present disclosure as detailed in the appended claims.

Figure 1:
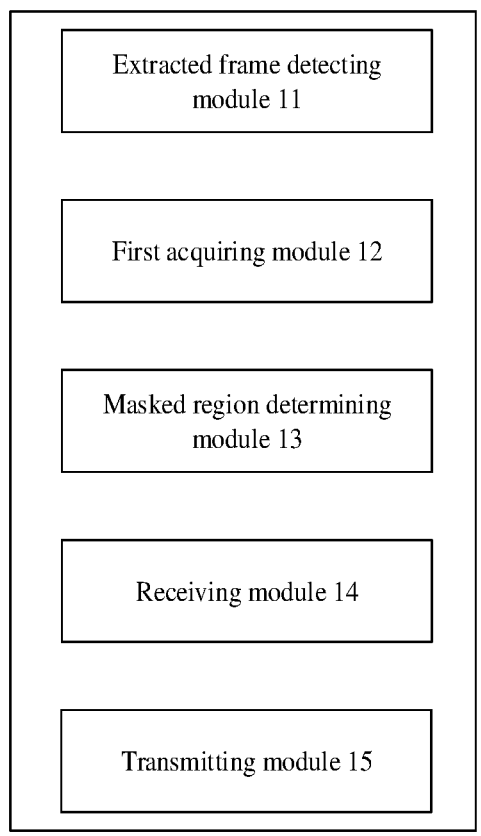
FIG. 1 illustrates a system for displaying bullet screens according to an embodiment.

An embodiment of the present disclosure provides a system for displaying bullet screens. The system includes a processor for implementing the functions of a plurality of virtual modules. FIG. 1 is a block diagram of a plurality of virtual modules implemented by a processor according to an embodiment. Referring to FIG. 1, the virtual modules include an extracted frame detecting module 11, a masked region determining module 13, a receiving module 14, and a transmitting module 15.

The extracted frame detecting module 11 is configured to detection boxes by detecting human-body parts of image frames in a target video.

The masked region determining module 13 is configured to determine a masked region of each of the image frames based on the detection boxes and a ratio of the detection boxes of the image frames in corresponding image frames.

The receiving module 14 is configured to receive a video playback request.

The transmitting module 15 is configured to transmit the target video, the masked region, and bullet screens to a client player based on the video playback request, wherein the client player hides the bullet screens in the masked region when playing the target video.

In some embodiments, the masked region determining module 13 is configured to determine that the masked region includes all the detection boxes based on the ratio being less than or equal to a second threshold.

In some embodiments, the masked region determining module 13 is configured to:

acquire key human-body parts in the target video based on the ratio being greater than or equal to a first threshold, the key human-body parts being some human-body parts of all human-body parts; and determine that the masked region includes the key detection boxes detected in the each of the image frames.

In some embodiments, the image frames are acquired by extracting image frames from the target video.

In some embodiments, the transmitting module 15 is configured to:

determine a target video stream in the target video based on the video playback request;

determine a target masked region and target bullet screens corresponding to the video stream based on a target video timestamp, a masked region timestamp and a bullet screen timestamp; and transmit the video stream, the target masked region, and the target bullet screens to the client player;

wherein the masked region timestamp is determined based on a timestamp of the image frame corresponding to the mask region.

Regarding the system in the above embodiment, the operations of the respective modules are described in the related method embodiments in detail, which are not elaborated herein.

Figure 2:
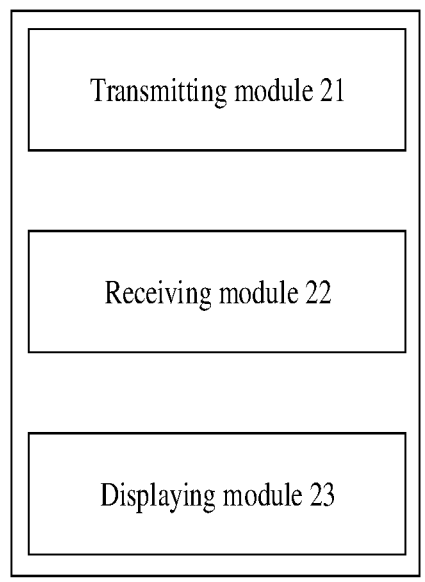
FIG. 2 illustrates another system for displaying bullet screens according to an embodiment.

An embodiment of the present disclosure provides a system for displaying bullet screens. The system includes a processor configured to implement the functions of a plurality of virtual modules. FIG. 2 is a block diagram of a plurality of virtual modules realized by a processor according to an embodiment. Referring to FIG. 2, the virtual modules include a transmitting module 21, a receiving module 22, and a displaying module 23.

The transmitting module 21 is configured to transmit a video playback request to a server.

The receiving module 22 is configured to receive a target video, a masked region of the target video, and bullet screens from the server in response to the video playback request.

The displaying module 23 is configured to hide the bullet screens in the masked region and display the bullet screens in a non-masked region in response to displaying the target video.

In some embodiments, the masked region is determined based on detection boxes in a plurality of image frames in the target video and a ratio of the detection boxes of the image frames in corresponding image frames.

In some embodiments, the receiving module 22 is configured to:

receive a target video stream determined by the server in the target video; and receive a target masked region and target bullet screens which correspond to the target video stream.

The displaying module 23 is configured to, when playing the target video stream, hide the target bullet screens in the target masked region, and display the target bullet screens in the non-masked region.

Regarding the system in the above embodiment, the operations of the respective modules are described in the related method embodiments in detail, which are not elaborated herein. The following method embodiment may be referred.

Figure 3:
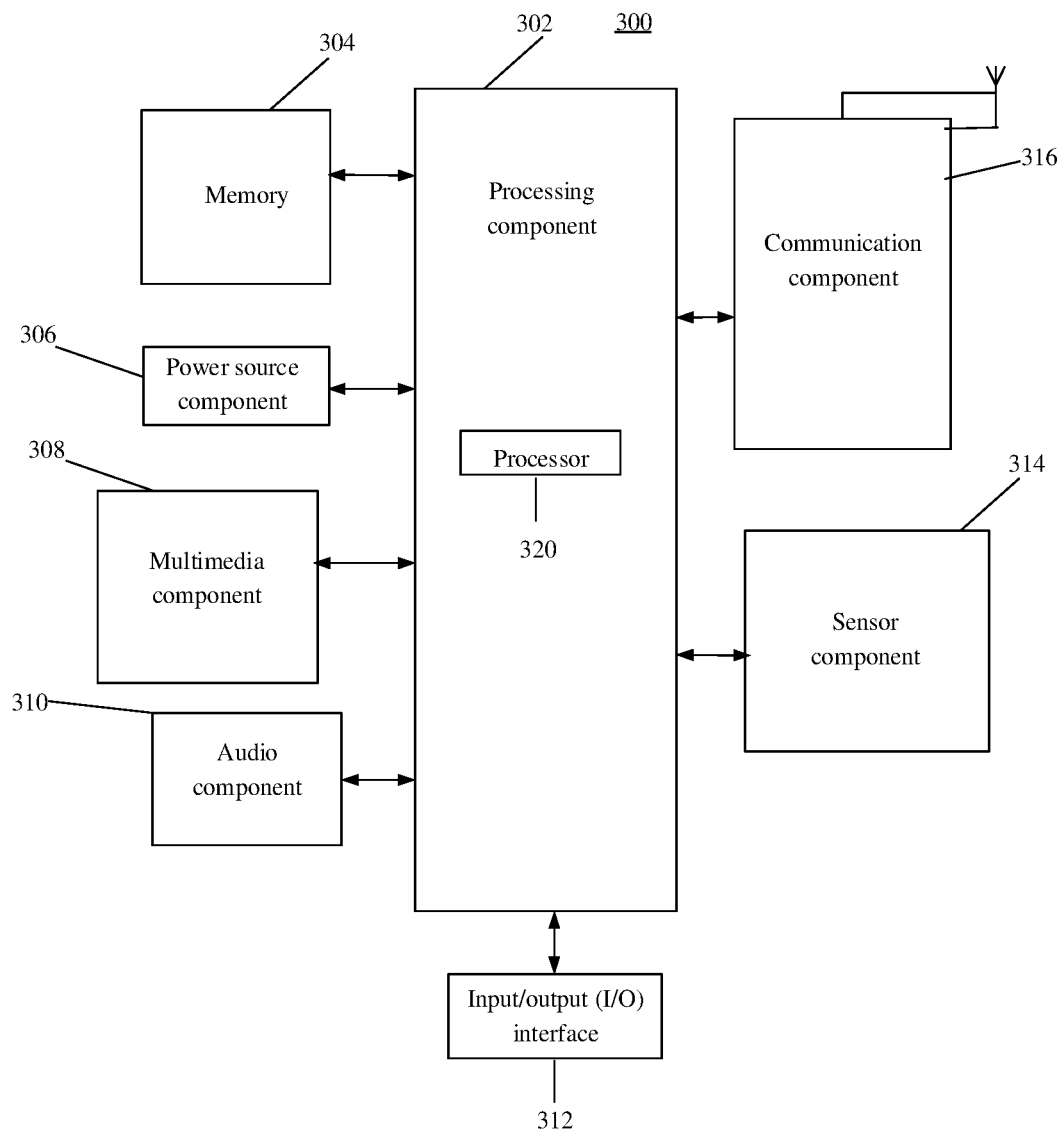
FIG. 3 is block diagram of an electronic device according to an embodiment.

FIG. 3 is block diagram of an electronic device 300 according to an embodiment. For example, the electronic device 300 may be a mobile phone, a computer, a digital broadcast terminal, a message transceiver device, a game console, a tablet device, a medical device, a fitness device, a personal digital assistant, or the like.

Referring to FIG. 3, the electronic device 300 may include one or more following components of: a processing component 302, a memory 304, a power source component 306, a multimedia component 308, an audio component 310, an input/output (I/O) interface 312, a sensor component 314, and a communication component 316.

The processing component 302 typically controls overall operations of the electronic device 300, such as the operations associated with display, telephone calls, data communication, camera operations, and recording operations.

In some embodiments, the processing component 302 includes one or more processors 320 configured to execute at least one instruction to perform steps of: acquiring detection boxes by detecting human-body parts in a plurality of image frames in a target video; determining a masked region of each of the image frames based on the detection boxes in the each of the image frames and a ratio of the detection boxes of the image frames in corresponding image frames; receiving a video playback request; and transmitting the target video, the masked region, and bullet screens to a client player based on the video playback request, wherein the client layers hides the bullet screens in the masked region when playing the target video.

In some embodiments, the processor 320 is configured to execute at least one instruction to perform a step of: determining that the masked region includes all the detection boxes based on the ratio being less than or equal to a second threshold.

In some embodiments, the processor 320 is configured to execute at least one instruction to perform steps of: acquiring key human-body parts in the target video based on the ratio being greater than or equal to a first threshold, the key human-body parts being some human-body parts of all human-body parts; and determining that the masked region includes the key detection boxes detected in the each of the image frames.

In some embodiments, the image frames are acquired by extracting image frames from the target video.

In some embodiments, the processor 320 is configured to execute at least one instruction to perform steps of: determining a target video stream in the target video based on the video playback request; determining a target masked region and target bullet screens corresponding to the video stream based on a target video timestamp, a masked region timestamp and a bullet screen timestamp; and transmitting the video stream, the target masked region, and the target bullet screens to the client player; wherein the masked region timestamp is determined based on a timestamp of the image frame corresponding to the mask region.

In some embodiments, the processor 320 is configured to execute at least one instruction to perform steps of: transmitting a video playback request to a server; receiving a target video, a masked region of the target video, and bullet screens from the server in response to the video playback request; and hiding the bullet screens in the masked region and displaying the bullet screens in a non-masked region in response to playing the target video.

In some embodiments, the masked region is determined based on detection boxes in a plurality of image frames in the target video and a ratio of the detection boxes of the image frames in corresponding image frames.

In some embodiments, the processor 320 is configured to execute at least one instruction to perform steps of: receiving a target video stream determined by the server in the target video; and receiving a target masked region and target bullet screens which correspond to the target video stream.

In some embodiments, the processor 320 is configured to execute at least instruction to perform a step of: when playing the target video stream, hiding the target bullet screens in the target masked region, and displaying the target bullet screens in the non-masked region.

Moreover, the processing component 302 may include one or more modules which facilitate interactions between the processing component 302 and other components. For instance, the processing component 302 may include a multimedia module to facilitate the interaction between the multimedia component 308 and the processing component 302.

The memory 304 is configured to store various types of data to support the operation of the electronic device 300. Examples of such data include instructions for any applications or methods operated on the terminal electronic device 300, contact data, phonebook data, messages, pictures, video, etc. The memory 304 may be implemented using any type of volatile or non-volatile memory devices, or a combination thereof, such as a static random-access memory (SRAM), an erasable programmable read-only memory (EPROM), a programmable read-only memory (PROM), a read-only memory (ROM), a magnetic memory, a flash memory, a magnetic or optical disk.

The power component 306 provides power to various components of the terminal electronic device 300. The power component 306 may include a power management system, one or more power sources, and any other components associated with the generation, management, and distribution of power in the terminal electronic device 300.

The multimedia component 308 includes a screen providing an output interface between the terminal electronic device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 308 includes a front camera and/or a rear camera. The front camera and the rear camera may receive an external multimedia datum while the electronic device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the terminal electronic device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the terminal electronic device 300. For instance, the sensor component 314 may detect an open/closed status of the electronic device 300, relative positioning of components, e.g., the display and the keypad, of the terminal electronic device 300, a change in position of the terminal electronic device 300 or a component of the terminal electronic device 300, a presence or absence of user contact with the terminal electronic device 300, an orientation or an acceleration/deceleration of the terminal electronic device 300, and a change in temperature of the terminal electronic device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the terminal electronic device 300 and other devices. The terminal electronic device 300 can access a wireless network based on a communication standard, such as Wi-Fi, 2G, or 3G, or a combination thereof. In one example embodiment, the communication component 316 receives a broadcast signal or broadcast associated information from an external broadcast management system via a broadcast channel. In one example embodiment, the communication component 316 further includes a near-field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example embodiment, the electronic device 300 may be implemented by one or more application specific integrated circuits (ASICs), digital signal processors (DSPs), digital signal processing devices (DSPDs), programmable logic devices (PLDs), field-programmable gate array (FPGAs), controllers, microcontrollers, microprocessors, or other electronic components to execute the method for displaying bullet screens described in any of the above embodiments.

In an example embodiment, there is also provided a non-transitory computer-readable storage medium including instructions, such as the memory 304 including the instructions which are executable by a processor 320 in the electronic device 300 to execute the method for displaying bullet screens described in any of the above embodiments. For example, the non-transitory computer-readable storage medium may be a ROM, a random access memory (RAM), a compact disc read-only memory (CD-ROM), a magnetic tape, a floppy disk, an optical data storage device, or the like.

An example embodiment provides a computer program product including at least one readable program cods therein. The at least one readable program code, when executed the processor 320 in the electronic device 300, causes the electronic device 300 to perform the method for displaying bullet screens described in any of the above embodiments. In some embodiments, the readable program codes are stored in a storage medium of the electronic device 300, and the storage medium is a non-transitory computer-readable storage medium, which for example may be a ROM, a RAM, a compact disc CD-ROM, a magnetic tape, a floppy disk, an optical data storage device, or the like.

Figure 4:
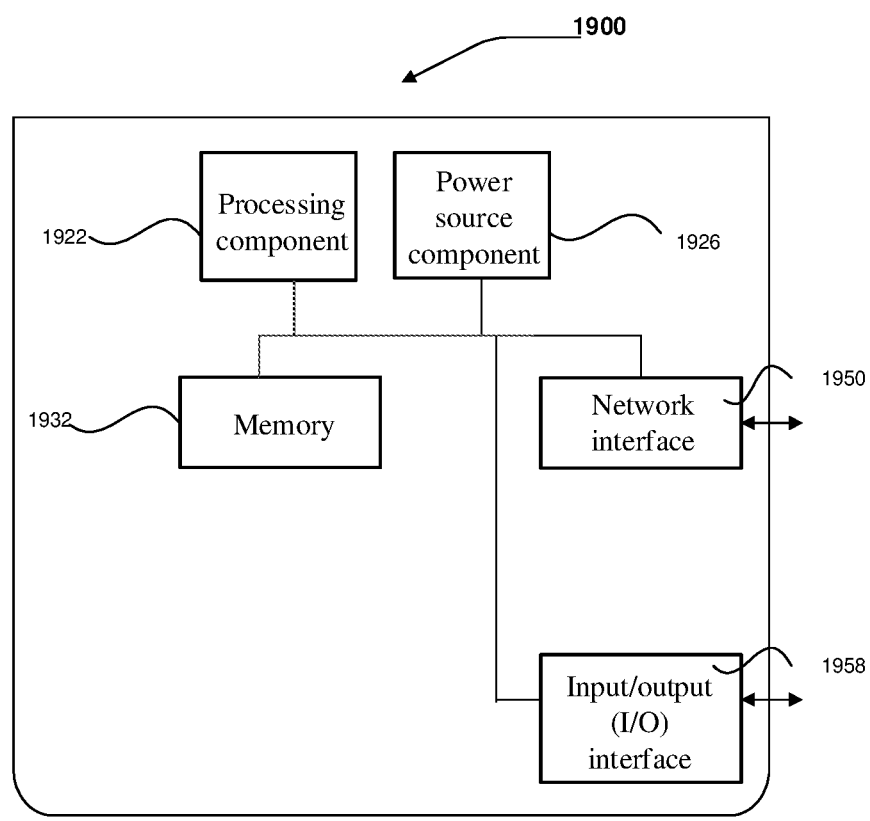
FIG. 4 is block diagram of another electronic device according to an embodiment.

FIG. 4 is block diagram of another electronic device 1900 according to an embodiment. For example, the electronic device 1900 may be provided as a server.

Referring to FIG. 4, the electronic device 1900 includes a processing component 1922 which further includes one or more processors, and memory resources represented by a memory 1932 for storing at least one instruction executable by the processing component 1922, for example an application program. The application program stored in the memory 1932 may include one or more modules, each of which corresponds to a set of instructions.

In some embodiments, the processing component 1922 is configured to execute instructions to realize the following steps: acquiring detection boxes by detecting human-body parts in a plurality of image frames in a target video; determining a masked region of each of the image frames based on the detection boxes in the each of the image frames and a ratio of the detection boxes of the image frames in corresponding image frames; receiving a video playback request; and transmitting the target video, the masked region, and bullet screens to a client player based on the video playback request, wherein the client layers hides the bullet screens in the masked region when playing the target video.

In some embodiments, the processing component 1922 is configured to execute at least one instruction to perform a step of: determining that the masked region includes all the detection boxes based on the ratio being less than or equal to a second threshold.

In some embodiments, the processing component 1922 is configured to execute at least one instruction to perform steps of: acquiring key human-body parts in the target video based on the ratio being greater than or equal to a first threshold, the key human-body parts being some human-body parts of all human-body parts; and determining that the masked region includes the key detection boxes detected in the each of the image frames.

In some embodiments, the image frames are acquired by extracting image frames from the target video.

In some embodiments, the processing component 1922 is configured to execute at least one instruction to perform steps of: determining a target video stream in the target video based on the video playback request; determining a target masked region and target bullet screens corresponding to the video stream based on a target video timestamp, a masked region timestamp and a bullet screen timestamp; and transmitting the video stream, the target masked region, and the target bullet screens to the client player; wherein the masked region timestamp is determined based on a timestamp of the image frame corresponding to the mask region.

In other embodiments, the processing component 1922 is configured to execute at least one instruction to perform steps of: transmitting a video playback request to a server; receiving a target video, a masked region of the target video, and bullet screens from the server in response to the video playback request; and hiding the bullet screens in the masked region and displaying the bullet screens in a non-masked region in response to playing the target video.

In other embodiments, the masked region is determined based on detection boxes in a plurality of image frames in the target video and a ratio of the detection boxes of the image frames in corresponding image frames.

In other embodiments, the processing component 1922 is configured to execute at least one instruction to perform steps of: receiving a target video stream determined by the server in the target video; and receiving a target masked region and target bullet screens which correspond to the target video stream.

In other embodiments, the processing component is configured to execute at least one instruction to perform a step of: when playing the target video stream, hiding the target bullet screens in the target masked region, and displaying the target bullet screens in the non-masked region.

The electronic device 1900 may also include a power source component 1926 configured to perform power source management of the electronic device 1900, a wired or wireless network interface 1950 configured to connect the electronic device 1900 to the network, and an input/output (I/O) interface 1958. The electronic device 1900 can operate an operating system stored in the memory 1932, such as Windows Server™, Mac OS X™, Unix™, Linux™, FreeBSD™ or the like.

Figure 5:
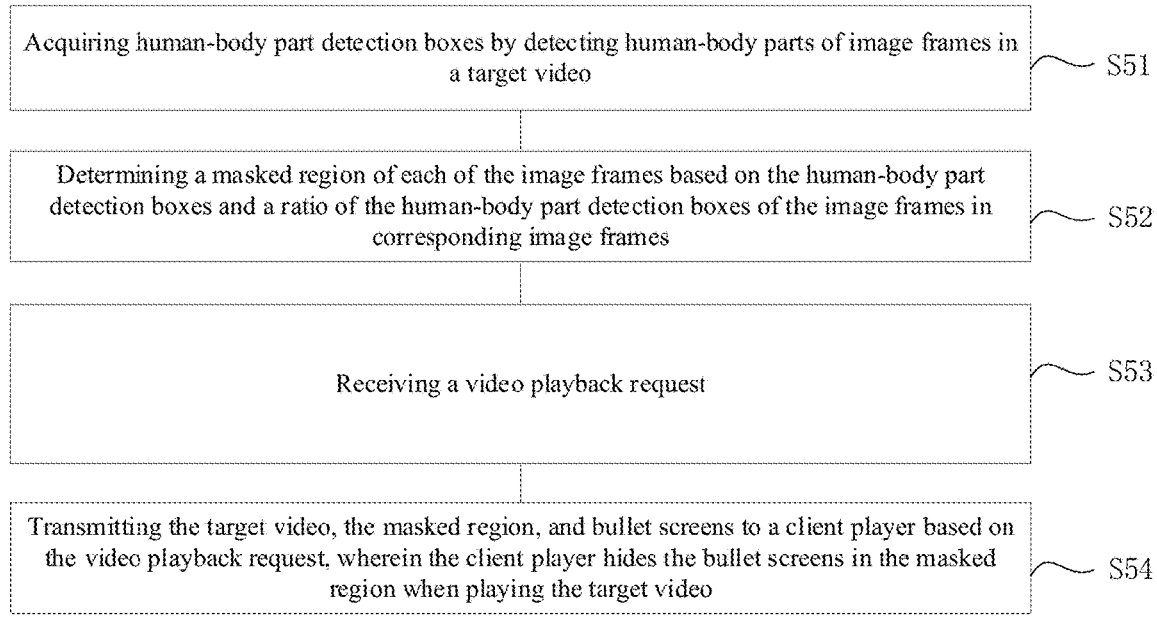
FIG. 5 is a flowchart of a method for displaying bullet screens according to an embodiment.

FIG. 5 is a flowchart of a method for displaying bullet screens according to an embodiment. As shown in FIG. 5, the method for displaying bullet screens is applicable to an electronic device, and includes the following steps.

In S51, detection boxes are acquired by detecting human-body parts of image frames in a target video.

In some embodiments, the image frames are acquired by extracting image frames from a target video. The electronic device extracts image frames from the target video, and acquires the detection boxes by detecting human-body parts in each of the extracted image frames.

In some embodiments, the execution subject in this embodiment is an electronic device (such as a server). The target video is a live streaming video or non-live streaming video.

S51 is a process in which the human-body parts of the images in the target video are detected to acquire the detection boxes. The above description merely takes that the images obtained by frame extraction is processed as an example. In some other embodiments, the electronic device further performs the foregoing detection step on each of the image frames, which will not be limited in the embodiments of the present disclosure.

In some embodiments, the electronic device extracts the image frames from the target video at a preset frame rate that is greater than or equal to 10 pfs and smaller than or equal to 30 fps. The value of the preset frame rate is determined according to actual demands, which is not limited in the embodiments of the present disclosure.

In some embodiments, the human-body parts refer to body parts of a person, such as a human face, an upper body, upper limbs, and lower limbs. The electronic device may detect the human-body parts using multiple target detection technologies. For example, the electronic device detects the human-body parts in each of a plurality of image frames using the MobileNet network+SSD framework or using the human image matting technology such as the Fast RCNN model, which is not limited in the embodiments of the present disclosure.

In some embodiments, during detection of the human-body parts, an excessively small detection target or some other extreme cases may be present. The electronic device may detect the human-body parts using the Fast RCNN and other technologies.

In some other embodiments, the MobileNet network+SSD framework is employed to distinguish and detect all parts of a human body. Since the MobileNet network+SSD framework only calibrates the human-body parts within a rough range, the obtained detection boxes are generally greater than the human-body parts.

Disaster recovery is performed on the MobileNet network+SSD framework to make this model satisfy detection requirements on real-time block-prevention. The disaster recovery ensures that each of the image frames may generate a detection box. For example, when a certain image does not generate a detection box, the detection boxes are determined based on detection results of the previous and subsequent frames, or by means of a partial image detection technology.

In S52, a masked region of each of the image frames is determined based on the detection boxes and a ratio of the detection boxes of the image frames in corresponding image frames.

In some embodiments, the ratio of the detection boxes of the image frames in corresponding image frames is calculated first, and then the masked (block-prevention) region is dynamically adjusted based on the ratio, the key human-body parts and the detection boxes to realize self-adaptive block prevention of different regions of the human body. For example, when the human body is close to a camera and a body ratio (the ratio of the detection boxes of the image frames in corresponding image frames) is great, only the key human-body parts, e.g., five sense organs, are prevented from being blocked (masked region) to ensure that the bullet screens are readable; and in the case that the human body is far away from the camera and the body ratio (the ratio of the detection boxes of the image frames in corresponding image frames) is great, more human-body parts are self-adaptively selected for block prevention (masked region).

The electronic device acquires key human-body parts in the target video based on the ratio being greater than or equal to a first threshold, the key human-body parts being some human-body parts of all human-body parts; and the electronic device determines that the masked region includes the key detection boxes detected in the each of the image frames.

The key human-body parts are some of the human-body parts. In some scenes, when a ratio of the human-body parts to the image is too great, i.e., when a user is too close to a screen, a very small non-masked region may be present in the image if all the detection boxes are used as masked regions. At this time, bullet screens are displayed a little or almost not displayed. By setting the key human-body parts, in this case, some of the human-body parts (e.g., important human-body parts), instead of all the human-body parts, are prevented from being blocked, which may reduce the area of the masked region. Thus, the bullet screens may also be displayed normally in this case.

In some embodiments, the key human-body parts are customized by the user. The user defines the human-body parts (e.g., the face) that are of interest to the target video as the key human-body parts.

For example, in the dancing scene, the key human-body parts are determined as the face, neck, upper body and upper limbs when the history habits of the anchor are upper-body dancing; in the dancing scene, the key human-body parts are determined as the face and hands when the history habits of the anchor are finger gymnastics; and in the microphone connection scene, the entire human body in a small screen and the face in a big screen on the image are determined as the key human-body parts.

For example, when the detection boxes include a face region, an upper-body region, and an upper-limb region, the ratio of the detection boxes of the image frames in corresponding image frames is the ratio of the sum of the face region, the upper-body region, and the upper-limb region (e.g., the sum of area) to the images to which these frames (area of the images) belong. In a multi-person scene, the ratio of the detection boxes of the image frames in corresponding image frames is the ratio of the sum of the detection boxes of multiple persons to the image to which the detection boxes belong.

In some embodiments, the electronic device determines that the masked region includes all the detection boxes based on the ratio being less than or equal to a second threshold.

In S53, a video playback request is received.

The execution subject in this embodiment receives a video playback request from a client (or WEB) player. The video playback request includes such information as the target video.

In S54, the target video, the masked region, and bullet screens are transmitted to a client player based on the video playback request. The client player hides the bullet screens in the masked region when playing the target video.

In some embodiments, the electronic device also displays the bullet screens in a non-masked region.

The bullet screens are the content displayed on the client player after the execution subject (the electronic device) in this embodiment filters the original bullet screens according to a preset display strategy. The target video, the bullet screens and the masked region are stored in the execution subject in this embodiment for the client player to call.

The execution subject in this embodiment transmits the target video, the masked region of the target video, and the bullet screens to the client player based on the video playback request transmitted by the client (or WEB) player. The client player merges the target video, the masked region of the target video, and the bullet screens and shows the merged content to the user.

In some embodiments, the electronic device determines a target video stream in the target video based on the video playback request; determines a target masked region and target bullet screens corresponding to the video stream based on a target video timestamp, a masked region timestamp and a bullet screen timestamp; and transmits the video stream, the target masked region, and the target bullet screens to the client player; wherein the masked region timestamp is determined based on a timestamp of the image frame corresponding to the mask region.

In the method for displaying bullet screens according to this embodiment, the mask region is determined based on the detection boxes and the ratio of the detection boxes of the image frames in corresponding image frames, i.e., the masked region is self-adaptively adjusted based on the ratio of the detection boxes of the image frames in corresponding image frames. Thus, self-adaptive block-prevention is performed on different regions of the human body in the image. In a human-themed video scene, this solution may dynamically balance the display of video content and the bullet screens.

Figure 6:
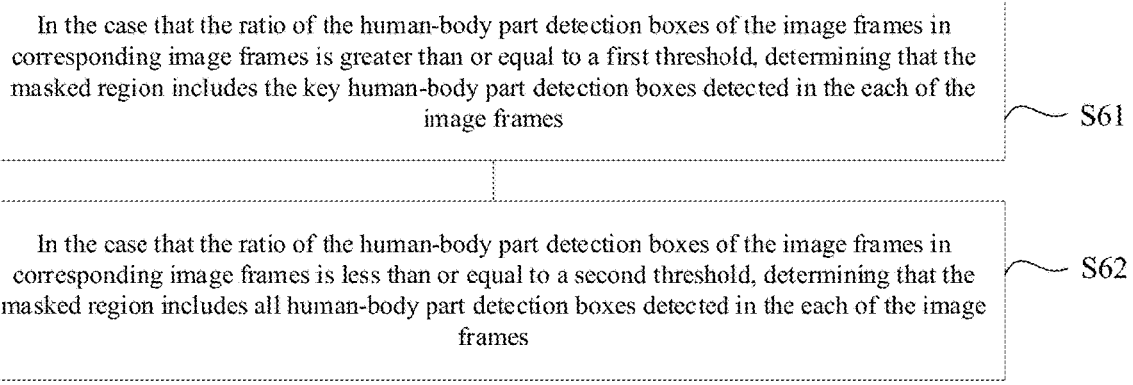
FIG. 6 is a flowchart of determining a masked region according to an embodiment.

In some embodiments, referring to FIG. 6, S52 includes:

in S61, in the case that the ratio of the detection boxes of the image frames in corresponding image frames is greater than or equal to a first threshold, determining that the masked region includes the key detection boxes detected in the each of the image frames.

Assuming that the key human-body part is the face (five sense organs), a large area of the human body is blocked in the image when the human body is close to the camera. That is, when the ratio of the detection boxes of the image frames in corresponding image frames is greater than or equal to the first threshold, the masked region (block-prevention region) of the image frame is determined as the face region (key detection box) to ensure that the bullet screens are readable.

Referring to FIG. 6, S52 further includes:

in S62, in the case that the ratio of the detection boxes of the image frames in corresponding image frames is less than or equal to a second threshold, determining that the masked region includes all detection boxes detected in the each of the image frames.

A small area of the human body is blocked in the image when the human body is far away from the camera, i.e., the masked region (block-prevention region) of the image is determined as the detected all detection boxes in the case that the ratio of the detection boxes of the image frames in corresponding image frames is less than or equal to the second threshold.

In some embodiments, the first threshold is greater than the second threshold. The values of the first threshold and the second threshold are determined according to actual conditions, and neither of the values is limited in the embodiments of the present disclosure.

In this embodiment, structured human detection results are acquired by detecting all parts of the human body in S51. Self-adaptive block-prevention is performed on different regions of the human body based on the structured human detection results and the key human-body parts, and strategy adjustment is performed on an effective display region of the bullet screen in the image frame. In the case that the human body is close to the camera and the ratio of the detection boxes of the image frames in corresponding image frames is greater than or equal to the first threshold, only the key human-body parts (e.g., five sense organs) are prevented from being blocked; in the case that the human body is far away from the camera and the ratio of the detection boxes of the image frames in corresponding image frames is less than or equal to the second threshold, all the human-body parts are selected for block prevention.

Figure 7:
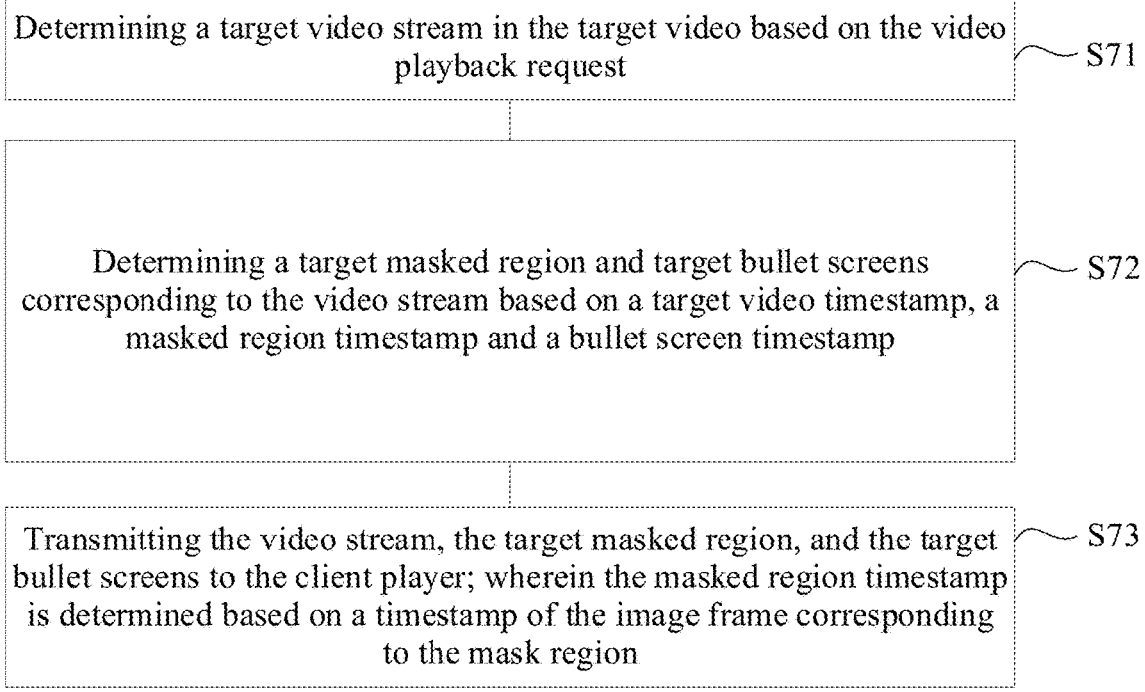
FIG. 7 is a flowchart of transmitting a target video, a masked region and bullet screens to a client player according to an embodiment.

In some embodiments, referring to FIG. 7, S53 includes the following steps.

In S71, a target video stream is determined in the target video based on the video playback request.

In some embodiments, the client player (e.g., a bullet screen player) initiates a video playback request, and the execution subject in this embodiment determines the target video stream based on the video playback request, such that the client player pulls the target video stream (e.g., live streaming) from a CDN for playback.

In S72, a target masked region and target bullet screens corresponding to the video stream are determined based on a target video timestamp, a masked region timestamp and a bullet screen timestamp.

A target masked region and target bullet screens corresponding to the target video stream are determined according to corresponding relationships among a target video timestamp, a masked region timestamp, and a bullet screen timestamp. The target masked region is a masked region whose timestamp corresponds to a target video timestamp recorded in the target video stream. The target bullet screens are bullet screens whose timestamp corresponds to the target video timestamp recorded in the target video stream. The timestamp of the masked region uses a timestamp identifier of the image to which the masked region belongs.

In some embodiments, the corresponding target masked region and target bullet screens are called using the timestamps recorded in the target video stream (e.g., live streaming) according to the corresponding relationships among the target video timestamp, the masked region timestamp, and the bullet screen timestamp. That is, the target masked region and the target bullet screens corresponding to the target video stream are acquired by aligning the target video timestamp, the masked region timestamp, and the bullet screen timestamp recorded in the target video stream. After that, the target video stream, the target masked region, and the target bullet screens are transmitted to the client player, merged by the client player, and then displayed to the user.

In S73, the video stream, the target masked region, and the target bullet screens are transmitted to the client player; wherein the masked region timestamp is determined based on a timestamp of the image frame corresponding to the mask region.

The target video stream, the target masked region and the target bullet screens are transmitted to the client player, such that the client player hides the target bullet screens in the target masked region and displays the target bullet screens in the non-target masked region when playing the target video stream.

In the method for displaying bullet screens according to this embodiment, the human body (human-body parts) in the target video stream is made consistent with the masked region by alignment of the timestamps during playing of the target video stream.

Figure 8:
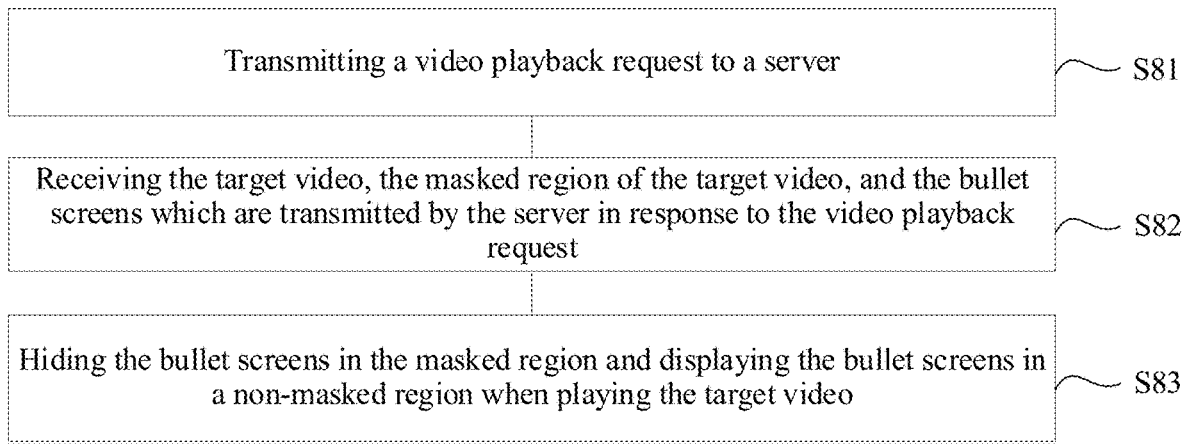
FIG. 8 is a flowchart of another method for displaying bullet screens according to an embodiment.

FIG. 8 is a flowchart of another method for displaying bullet screens according to an example embodiment. As shown in FIG. 8, the method includes the following steps.

In S81, a video playback request is transmitted to a server.

The execution subject in this embodiment is an electronic device, such as a client or a WEB player. The execution subject transmits the video playback request to the server. The video playback request is intended to instruct the server to return a target video, a masked region and bullet screens corresponding to the video playback request.

In S82, the target video, the masked region of the target video, and the bullet screens which are transmitted by the server in response to the video playback request are received.

In some embodiments, the masked region is determined based on detection boxes in a plurality of image frames in the target video and a ratio of the detection boxes of the image frames in corresponding image frames.

In some other embodiments, the execution subject in this embodiment receives the target video, the masked region of the target video, and the bullet screens transmitted by the server. The server acquires the detection boxes by extracting image frames from the target video and detecting human-body parts in each of the extracted frames, and the masked region of the target video is determined based on key human-body parts, the detection boxes in the images and the ratio of the detection boxes of the image frames in corresponding image frames. The method for determining the masked region may refer to the descriptions in the aforementioned embodiments, and will not be repeated herein.

In S83, the client player hides the bullet screens in the masked region and displays the bullet screens in a non-masked region when playing the target video.

In the case that a client player plays the target video, the bullet screens are hidden in the masked region and displayed in the non-masked region.

In some embodiments, S82 includes:
receiving a target video stream determined by the server in the target video, and receiving a target masked region and target bullet screens which correspond to the target video stream;

The target video stream is determined by the server based on the video playback request, and the target masked region is determined by aligning a timestamp recorded in the target video stream with a masked region timestamp. The target bullet screens is determined by aligning a timestamp recorded in the target video stream with a bullet screen timestamp.

In this embodiment, S83 includes:
hiding the target bullet screens in the target masked region and displaying the target bullet screens in the non-masked region in response to playing the target video stream.

The methods for determining the target masked region and the target bullet screens may be reference to the descriptions in the aforementioned embodiments, which is not repeated herein.

Other embodiments of the present disclosure are apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as examples only, and the true scope and spirit of the present disclosure are indicated by the following claims.

It may be appreciated that the present disclosure is not limited to the exact construction that has been described above and illustrated in the accompanying drawings, and that various modifications and variations can be made without departing from the scope thereof. It is intended that the scope of the present disclosure is only defined by the appended claims.

What is claimed is:
1. A method for displaying bullet screens, comprising:
acquiring human-body part detection boxes by detecting human-body parts displayed in a target image frame, the target image frame being one image frame of a plurality of image frames in a target video, and each of the human-body parts corresponding to one detection box;

determining a masked region of the target image frame based on the detection boxes in the target image frame and an area ratio of the detection boxes to the target image frame;

receiving a video playback request; and transmitting the target image frame in the target video, the masked region of the target image frame, and bullet screens to a client player based on the video playback request, wherein the client player hides the bullet screens in the masked region when playing the target video, wherein said determining the masked region of the target image frame comprises:

acquiring key human-body parts in response to the area ratio being greater than or equal to a first threshold, the key human-body parts being some human-body parts of all human-body parts displayed in the target image frame; and determining the detection boxes corresponding to the key human-body parts as the masked region.

2. The method according to claim 1, wherein said determining the masked region of the target image frame further comprises:

determining all the detection boxes in the target image frame as the masked region in response to the area ratio being less than or equal to a second threshold, wherein the first threshold is greater than the second threshold.

3. The method according to claim 1, wherein the target image frame is acquired by extracting image frames from the target video.

4. The method according to claim 1, wherein said transmitting the target image frame in the target video, the masked region of the target image frame, and the bullet screens comprises:

determining a target video stream in the target video based on the video playback request;

determining a target masked region and target bullet screens corresponding to the video stream based on a target video timestamp, a masked region timestamp and a bullet screen timestamp; and transmitting the video stream, the target masked region, and the target bullet screens to the client player;

wherein the masked region timestamp is determined based on a timestamp of the image frame corresponding to the mask region.

5. A method for displaying bullet screens, comprising:

transmitting a video playback request to a server;

receiving a target image frame in a target video, a masked region of the target image frame, and bullet screens from the server in response to the video playback request; and hiding the bullet screens in the masked region and displaying the bullet screens in a non-masked region in response to playing the target video, wherein the masked region of the target image frame is determined based on human-body part detection boxes in the target image frame and an area ratio of the detection boxes to the target image frame, the detection boxes being acquired by detecting human-body parts displayed in the target image frame, the target image frame being one image frame of a plurality of image frames in the target video, and each of the human-body parts corresponding to one detection box, wherein in response to the area ratio being greater than or equal to a first threshold, key human-body parts in the target video are acquired, the key human-body parts being some human-body parts of all human-body parts displayed in the target image frame; and the detection boxes corresponding to the key human-body parts are determined as the masked region.

6. The method according to claim 5, wherein said receiving the target image frame in the target video, the masked region of the target image frame, and the bullet screens comprises:

receiving a target video stream determined by the server in the target video; and receiving a target masked region and target bullet screens which correspond to the target video stream; and said hiding the bullet screens in the masked region and displaying the bullet screens in the non-masked region comprises:

when playing the target video stream, hiding the target bullet screens in the target masked region, and displaying the target bullet screens in the non-masked region.

7. An electronic device comprising:

a processor; and a memory storing at least one instruction executable by the processor;

wherein the at least one instruction, when executed by the processor, causes the processor to perform a method comprising:

acquiring detection boxes by detecting human-body parts displayed in a target image frame, the target image frame being one image frame of a plurality of image frames in a target video, and each of the human-body parts corresponding to one detection box;

determining a masked region of the target image frame based on the detection boxes in the target image frame and an area ratio of the detection boxes to the target image frame;

receiving a video playback request; and transmitting the target image frame in the target video, the masked region of the target image frame, and bullet screens to a client player based on the video playback request, wherein the client layers hides the bullet screens in the masked region when playing the target video, wherein said determining the masked region of the target image frame comprises:

acquiring key human-body parts in response to the area ratio being greater than or equal to a first threshold, the key human-body parts being some human-body parts of all human-body parts displayed in the target image frame; and determining the detection boxes corresponding to the key human-body parts as the masked region.

8. The electronic device according to claim 7, wherein said determining the masked region of the target image frame further comprises:

determining all the detection boxes in the target image frame as the masked region in response to the area ratio being less than or equal to a second threshold, wherein the first threshold is greater than the second threshold.

9. The electronic device according to claim 7, wherein the target image frame is acquired by extracting image frames from the target video.

10. The electronic device according to claim 7, wherein said transmitting the target image frame in the target video, the masked region of the target image frame, and the bullet screens comprises:

determining a target video stream in the target video based on the video playback request;

determining a target masked region and target bullet screens corresponding to the video stream based on a target video timestamp, a masked region timestamp and a bullet screen timestamp; and transmitting the video stream, the target masked region, and the target bullet screens to the client player;

wherein the masked region timestamp is determined based on a timestamp of the image frame corresponding to the mask region.

* * * * *